(12) United States Patent
Araki et al.

(10) Patent No.: US 6,667,264 B2
(45) Date of Patent: Dec. 23, 2003

(54) SILICON NITRIDE SINTERED MATERIAL AND PROCESS FOR PRODUCTION THEREOF

(76) Inventors: Kiyoshi Araki, c/o NGK Insulators, Ltd. 2-56, Suda-Cho, Mizuho-Ku, Nagoya-City Aichi-Prefecture (JP), 467-8530; Tsuneaki Ohashi, c/o NGK Insulators, Ltd. 2-56, Suda-Cho, Mizuho-Ku, Nagoya-City Aichi-Prefecture (JP), 467-8530; Katsuhiro Inoue, c/o NGK Insulators, Ltd. 2-56, Suda-Cho, Mizuho-Ku, Nagoya-City Aichi-Prefecture (JP), 467-8530; Masaaki Masuda, c/o NGK Insulators, Ltd. 2-56, Suda-Cho, Mizuho-Ku, Nagoya-City Aichi-Prefecture (JP), 467-8530

( * ) Notice: Subject to any disclaimer, the term of this patent is extended or adjusted under 35 U.S.C. 154(b) by 0 days.

(21) Appl. No.: 10/326,957

(22) Filed: Dec. 20, 2002

(65) Prior Publication Data

US 2003/0148870 A1 Aug. 7, 2003

Related U.S. Application Data

(62) Division of application No. 09/680,137, filed on Oct. 4, 2000, now Pat. No. 6,541,406.
(60) Provisional application No. 60/165,630, filed on Nov. 15, 1999.

(51) Int. Cl.$^7$ .............................................. C04B 35/587
(52) U.S. Cl. ......................... 501/97.2; 501/92; 501/97.4; 264/683
(58) Field of Search ........................ 501/92, 97.2, 97.4; 264/683

(56) References Cited

U.S. PATENT DOCUMENTS

| | | | | |
|---|---|---|---|---|
| 5,668,069 | A | 9/1997 | Sato et al. | 501/97.2 |
| 6,162,386 | A | 12/2000 | Matsubara | 264/656 |
| 6,313,054 | B1 | 11/2001 | Matsubara | 501/97.1 |

FOREIGN PATENT DOCUMENTS

| | | |
|---|---|---|
| JP | 63-100067 | 5/1988 |
| JP | 3-205363 | 9/1991 |
| JP | 3-290369 | 12/1991 |
| JP | 4-46062 | 2/1992 |
| JP | 5-330919 | 12/1993 |
| JP | 11-220012 | 8/1999 |

*Primary Examiner*—Karl Group

(57) ABSTRACT

A silicon nitride sintered material includes a polycrystal material having silicon nitride crystal grains and a grain boundary phase. The sintered material contains a Yb element in an amount of 2 to 30% by weight in terms of its oxide and an Al element in an amount of 1 to 20% by weight in terms of its oxide and has a thermal conductivity of 40 W/mK or less at room temperature, a resistivity of $1\times10^5$ to $1\times10^{12}$ Ω·cm at room temperature, and a porosity of 0.5% or less.

3 Claims, No Drawings

SILICON NITRIDE SINTERED MATERIAL AND PROCESS FOR PRODUCTION THEREOF

This application is a divisional application of U.S. application Ser. No. 09/680,137 filed Oct. 4, 2000, Now U.S. Pat. No. 6,541,406, the entirety of which is incorporated herein by reference, which is the nonprovisional application of U.S. Provisional Application Serial No. 60/165,630 filed Nov. 15, 1999.

BACKGROUND OF THE INVENTION AND RELATED ART STATEMENT

The present invention relates to a silicon nitride sintered material which has heat-shieldability, appropriate electrical conductivity, high strength and excellent corrosion resistance and which is dense, as well as to a process for production thereof.

As a member used for holding or transferring a to-be-treated material or a to-be-transferred material, used in equipment for semiconductor production, equipment for production of flat panel displays, or equipment used for hard disc production, etc., i.e. a holding or transferring member, or as a member constituting the inside of a treating chamber, there have been proposed members made of a ceramic material, for their corrosion resistance and abrasion resistance.

In general, a to-be-treated material or a to-be-transferred material, for example, a circuit-formed silicon wafer, when placed in production equipment such as mentioned above, may be destroyed by discharging. Additionally, there has been a problem that the small particles present inside a treating chamber adhere electrostatically onto a holding or transferring member or a member constituting the inside of a treating chamber and consequently the particles adhere onto a to-be-treated material or a to-be-transferred material.

It is generally known that a to-be-treated material or a to-be-transferred material is preferably kept at a constant temperature during the transferring.

For the matters mentioned above, it is preferred that a ceramic material used in the above-mentioned holding or transferring member or in the above-mentioned member constituting the inside of a treating chamber is not a perfect insulator and has appropriate electrical conductivity, is low in thermal conductivity, and has heat-shieldability and heat insulation.

As the ceramic material used in such applications, there are known, for example, a material comprising an insulating ceramic (e.g. alumina, zirconia or silicon nitride) and conductive particles (e.g. SiC, TiN or $ZrB_2$) dispersed therein.

Such a ceramic material having conductive particles dispersed is ordinarily a perfect conductive material owing to the connection among the particles and can be free from a problem of electrification; however, it has too low a resistance of less than $1\times10^5$ Ω·cm and has had a problem of generating a leakage current.

The ceramic material having conductive particles dispersed can be allowed to have an appropriately low electrical resistance by controlling the size and amount of the conductive particles; however, the control of the size and amount has been difficult practically.

Hence, the present applicant proposed, in Japanese Patent Application 11-176478, use of a ytterbium oxide as a sintering aid for silicon nitride to reduce the electric resistance of the silicon nitride sintered material obtained.

Further, it is described in JP-A-11-220012 that by allowing silicon nitride to contain a particular proportion of ytterbium, the silicon nitride sintered material obtained has a volume resistivity (a resistivity) of $10^8$ to $10^{12}$ Ω·cm at a temperature range of 100 to 250° C.

The ytterbium-containing silicon nitride materials mentioned above require a high temperature for liquid phase formation in sintering because they contain ytterbium as a sintering aid and must be fired at high temperatures (1,900 to 1,950° C. in Japanese Patent Application 11-176478 and 1,900° C. in JP-A-11-220012); however, firing at such high temperatures has had a problem of striking particle growth and high thermal conductivity (79 W/mK or more in Japanese Patent Application 11-176478 and 50 W/mK or more in JP-A-11-220012).

In view of the above-mentioned problems of the prior art, the present invention aims at providing a silicon nitride sintered material which has heat-shieldability, appropriate electrical conductivity, high strength and excellent corrosion resistance and which is dense, and a process for production thereof.

SUMMARY OF THE INVENTION

According to the present invention, there is provided a silicon nitride sintered material comprising a polycrystal material having silicon nitride crystal grains and a grain boundary phase, which sintered material contains a Yb element in an amount of 2 to 30% by weight in terms of its oxide and an Al element in an amount of 1 to 20% by weight in terms of its oxide and has a thermal conductivity of 40 W/mK or less at room temperature, a resistivity of $1\times10^5$ to $1\times10^{12}$ Ω·cm at room temperature, and a porosity of 0.5% or less.

According to the present invention, there is also provided a process for producing a silicon nitride sintered material, which comprises; subjecting a raw material obtained by adding a Yb element and an Al element to a silicon nitride powder, molding to obtain a molded material, and then firing the molded material in a non-oxidizing atmosphere, wherein the silicon nitride powder contains a β-silicon nitride powder in an amount of 10 parts by weight or more per 100 parts by weight of the silicon nitride powder and the firing is conducted at 1,850° C. or below.

The silicon nitride sintered material of the present invention is a polycrystal material which contains a ytterbium element in an amount of 2 to 30% by weight in terms of its oxide and an aluminum element in an amount of 1 to 20% by weight in terms of its oxide and which has a thermal conductivity of 40 W/mK or less at room temperature, a resistivity of $1\times10^5$ to $1\times10^{12}$ Ω·cm at room temperature, and a porosity of 0.5% or less.

By using such a constitution, there can be obtained a silicon nitride sintered material which has heat-shieldability, appropriate electric conductivity, high strength and excellent corrosion resistance and which is dense; therefore, the sintered material can be suitably used, for example, as a member for use in equipment for semiconductor production or a member for mounting an electronic part(s) thereon.

The main feature of the silicon nitride sintered material of the present invention lies in that it contains a ytterbium element in an amount of 2 to 30% by weight, preferably 10 to 20% by weight in terms of its oxide and an aluminum element in an amount of 1 to 20% by weight, preferably 2 to 10% by weight in terms of its oxide.

The reason is as follows. When the content of the ytterbium element is less than 2% by weight in terms of its oxide, it is impossible to obtain a sufficiently low electrical resistance; when the ytterbium element content is more than 30% by weight, sintering is difficult and, consequently, it is impossible to obtain a low electrical resistance and the bending strength obtained is low.

When the aluminum element content is less than 1% by weight in terms of its oxide, it is impossible to obtain a sufficiently low thermal conductivity; when the aluminum element content is more than 20% by weight, sintering is difficult and, consequently, it is impossible to obtain a low electrical resistance and the bending strength obtained is low.

The ytterbium element and aluminum element used in silicon nitride powder are preferably oxides in view of the availability, but may each be other compound or a metal.

By allowing silicon nitride to contain ytterbium and aluminum, the melting point of grain boundary phase can be synergistically reduced and low-temperature firing at 1,800° C. or below becomes possible; further, by allowing silicon nitride to contain aluminum, the thermal conductivity and resistivity of silicon nitride sintered material obtained can be changed proportionally, as shown in Table 2. In other words, by allowing silicon nitride to contain not only ytterbium but also aluminum, it is possible to control the resistivity of silicon nitride sintered material.

When the ytterbium element and aluminum element used in silicon nitride powder satisfy the above requirements, it is possible to allow the silicon nitride powder to contain, as necessary, other sintering aids, for example, $Y_2O_3$ or MgO, or to contain, as necessary, a transition metal compound (e.g. $Mo_2C$), SiC or the like to impart light-shieldability to the sintered material obtained.

Thereby, these particles are dispersed in the sintered material and light-shield ability and high strength can be imparted to the sintered material.

Further, the silicon nitride powder used in the present invention preferably contains a β-silicon nitride powder (a β-powder) in an amount of 10 parts by weight or more per 100 parts by weight of the silicon nitride powder.

By thus controlling the amount of the β-powder contained in the silicon nitride powder as part of the starting material, at 10% by weight or more, a dense silicon nitride sintered material can be obtained even if the firing temperature is as low as 1,850° C. or below.

The control of the amount of the β-powder contained in the silicon nitride powder as part of the starting material can be conducted by adding a β-powder to an α-powder (this α-powder originally contains a certain amount of a β-phase) or using an appropriately selected α-powder containing a required amount of a β-powder.

The proportion of β-phase in the present silicon nitride sintered material is a sum of the amount of β-silicon nitride in starting material and the amount generated in sintering by transformation from α-phase to β-phase, and there is no restriction as to the proportion as long as the properties of the present silicon nitride sintered material are not impaired.

Next, in producing a silicon nitride sintered material of the present invention, it is important that the firing temperature is controlled at 1,850° C. or below, preferably at 1,550 to 1,800° C. in order to prevent an increase in the thermal conductivity of silicon nitride sintered material.

When the firing temperature is higher than 1,800° C., it is preferred to conduct firing under a gas pressure to suppress the decomposition of silicon nitride; when the firing temperature is 1,800° C. or below, it is preferred to conduct firing at normal pressure in a non-oxidizing atmosphere from the cost standpoint.

In the present invention, the firing may be conducted as necessary by hot pressing, hot isostatic pressing, or the like.

The silicon nitride sintered material produced by the present process is a polycrystal material having a thermal conductivity of 40 W/mK or less at room temperature, a resistivity of $1 \times 10^5$ to $1 \times 10^{12}$ Ω·cm at room temperature, and a porosity of 0.5% or less, and there can be obtained a silicon nitride sintered material which has heat-shieldability, appropriate electrical conductivity, high strength and excellent corrosion resistance and which is dense.

The present invention is described in more detail by way of Examples. However, the present invention is in no way restricted to these Examples.

The silicon nitride sintered materials obtained by the Examples were measured for the properties by the following methods.

Measurement of Porosity

Made by the Archimedes method using water as a solvent.

(Measurement of thermal conductivity)

Made by the laser flush method according to JIS R 1611, using a sample (a sintered material) having a cylindrical shape of 10 mm (diameter)×3 mm (height).

Measurement of Resistivity

Made by the three-probe method according to JIS C 2141, in air using a sample (a sintered material) having a sheet shape of 50 mm×50 mm×1 mm (thickness).

The electrode was formed by coating of an Ag paste, and the measurement voltage (intensity of electric field) was 500 V/mm.

Measurement of Bending Strength

Four-point bending strength was measured according to JIS R 1601 using a sample (a sintered material) having a square stick shape of 4 mm×3 mm×40 mm, and the average value of five samples was taken as bending strength.

EXAMPLES 1 to 10 AND COMPARATIVE EXAMPLES 1 to 4

An α-silicon nitride powder of 0.5 μm in average particle diameter containing 1.3% by weight of oxygen and 3% by weight of a β-phase was mixed with a β-silicon nitride powder, whereby a silicon nitride powder containing 20% by weight of a β-phase was prepared.

To this silicon nitride powder were added a ytterbium oxide ($Yb_2O_3$) powder and an alumina ($Al_2O_3$) powder in the proportions shown in Table 1 or 2, to prepare a raw material powder (each proportion is shown as a weight ratio when the raw material powder is taken as 100).

Water was added to the raw material powder; they were mixed and ground using an attritor to produce a slurry; an organic binder was added as necessary; then, granulation and drying were conducted using a spray drier to produce a granulation powder.

The granulation powder was subjected to monoaxial pressing using a die and then to cold isostatic pressing at 690 MPa to produce a square sheet [70 mm×70 mm×6 mm (thickness)]-shaped molded material.

Next, the molded material was fired in a nitrogen gas at ordinary temperature at 1,700° C. for 3 hours, whereby each silicon nitride sintered material was produced.

The properties of each silicon nitride sintered material obtained are shown in Tables 1 and 2.

TABLE 1

Effect of $Yb_2O_3$ amount

| | β ratio of silicon nitride (%) | Yb amount as $Yb_2O_3$ (wt. %) | Al amount as $Al_2O_3$ (wt. %) | Firing temperature (° C.) | Firing time (hr) | Porosity (%) | Thermal conductivity (W/mK) | Resistivity (Ω cm) | Bending strength (MPa) |
|---|---|---|---|---|---|---|---|---|---|
| Comparative Example 1 | 20 | 1 | 3 | 1700 | 3 | 0.01 | 25 | $1 \times 10^{14}$ | 910 |
| Example 1 | 20 | 2 | 3 | 1700 | 3 | 0.01 | 27 | $1 \times 10^{12}$ | 860 |
| Example 2 | 20 | 5 | 3 | 1700 | 3 | 0.02 | 30 | $3 \times 10^{11}$ | 820 |
| Example 3 | 20 | 10 | 3 | 1700 | 3 | 0.02 | 28 | $1 \times 10^{11}$ | 780 |
| Example 4 | 20 | 15 | 3 | 1700 | 3 | 0.02 | 31 | $6 \times 10^{10}$ | 750 |
| Example 5 | 20 | 30 | 3 | 1700 | 3 | 0.5 | 33 | $1 \times 10^{10}$ | 660 |
| Comparative Example 2 | 20 | 40 | 3 | 1700 | 3 | 2.6 | 28 | $2 \times 10^{13}$ | 510 |

TABLE 2

Effect of $Al_2O_3$ amount

| | β ratio of silicon nitride (%) | Yb amount as $Yb_2O_3$ (wt. %) | Al amount as $Al_2O_3$ (wt. %) | Firing temperature (° C.) | Firing time (hr) | Porosity (%) | Thermal conductivity (W/mK) | Resistivity (Ω cm) | Bending strength (MPa) |
|---|---|---|---|---|---|---|---|---|---|
| Comparative Example 3 | 20 | 15 | 0.5 | 1700 | 3 | 0.01 | 56 | $9 \times 10^{9}$ | 680 |
| Example 6 | 20 | 15 | 1 | 1700 | 3 | 0.02 | 40 | $1 \times 10^{10}$ | 720 |
| Example 7 | 20 | 15 | 3 | 1700 | 3 | 0.02 | 31 | $6 \times 10^{10}$ | 750 |
| Example 8 | 20 | 15 | 5 | 1700 | 3 | 0.01 | 23 | $3 \times 10^{11}$ | 730 |
| Example 9 | 20 | 15 | 10 | 1700 | 3 | 0.02 | 16 | $1 \times 10^{12}$ | 720 |
| Example 10 | 20 | 15 | 20 | 1700 | 3 | 0.4 | 14 | $9 \times 10^{11}$ | 670 |
| Comparative Example 4 | 20 | 15 | 30 | 1700 | 3 | 3.3 | 13 | $3 \times 10^{13}$ | 420 |

Example 11

An α-silicon nitride powder of 0.5 μm in average particle diameter containing 1.3% by weight of oxygen and 3% by weight of a β-phase was mixed with a β-silicon nitride powder, whereby silicon nitride powders each containing a β-phase in a weight ratio shown in Table 3, 4 or 5 were prepared.

Next, there were prepared raw material powders each containing 82% by weight of one of the above silicon nitride powders, 15% by weight of an ytterbium oxide ($Yb_2O_3$) powder and 3% by weight of an alumina ($Al_2O_3$) powder.

Water was added to each raw material powder; they were mixed and ground using an attritor to produce various slurries; an organic binder was added as necessary; then, granulation and drying were conducted using a spray drier to produce granulation powders.

Each granulation powder was subjected to monoaxial pressing using a die and then to cold isostatic pressing at 690 MPa to produce square sheet [70 mm×70 mm×6 mm (thickness)]-shaped molded materials.

Each molded material was subjected to firing for 3 hours at a firing temperature shown in Table 3, 4 or 5.

The firing was conducted in a nitrogen gas atmosphere of about 1 MPa when the firing temperature was 1800° C. or above, and in a nitrogen gas of normal pressure when the firing temperature was 1,700° C.

Each silicon nitride powder used above, was measured for proportion (weight ratio) of β-phase. The silicon nitride sintered materials obtained at various firing temperatures (° C.) were measured for porosity (%), resistivity (Ω·cm) and thermal conductivity (W/mK). The results are shown in Tables 3 to 5.

TABLE 3

Porosity (%)

| β-phase proportion (%) in silicon nitride powder | Firing temperature (° C.) | | | |
|---|---|---|---|---|
| | 1700 | 1800 | 1850 | 1900 |
| 3 | 7.2 | 3.1 | 2.1 | 0.1 |
| 10 | 0.5 | 0.5 | 0.5 | 0.05 |
| 20 | 0.02 | 0.02 | 0.01 | 0.02 |
| 30 | 0.01 | 0.01 | 0.01 | 0.01 |

TABLE 4

Resistivity (Ωcm)

| β-phase proportion (%) in silicon nitride powder | Firing temperature (° C.) | | | |
|---|---|---|---|---|
| | 1700 | 1800 | 1850 | 1900 |
| 3 | $2 \times 10^{14}$ | $9 \times 10^{13}$ | $1 \times 10^{14}$ | $4 \times 10^{11}$ |
| 10 | $1 \times 10^{12}$ | $9 \times 10^{11}$ | $9 \times 10^{11}$ | $1 \times 10^{11}$ |
| 20 | $6 \times 10^{10}$ | $5 \times 10^{10}$ | $3 \times 10^{10}$ | $1 \times 10^{10}$ |
| 30 | $5 \times 10^{10}$ | $6 \times 10^{10}$ | $1 \times 10^{10}$ | $9 \times 10^{9}$ |

TABLE 5

| β-phase proportion (%) in silicon nitride powder | Thermal conductivity (W/mK) Firing temperature (° C.) | | | |
|---|---|---|---|---|
| | 700 | 1800 | 1850 | 1900 |
| 3 | 30 | 31 | 31 | 62 |
| 10 | 32 | 33 | 35 | 63 |
| 20 | 31 | 35 | 39 | 65 |
| 30 | 35 | 37 | 40 | 70 |

Consideration for Examples 1 to 11 and Comparative Examples 1 to 4

As shown in Table 1, in each of Examples 1 to 10, it was possible to obtain a thermal conductivity of 40 W/mK or less at room temperature, a resistivity of $1 \times 10^{12}$ Ω·cm or less at room temperature and a porosity of 0.5% or less; therefore, a silicon nitride sintered material could be obtained which had heat-shieldability, appropriate electrical conductivity, high strength and excellent corrosion resistance and which was dense.

Meanwhile, when the ytterbium element content was less than 2% by weight in terms of its oxide (Comparative Example 1), it was impossible to obtain a sufficiently low electrical resistance; when the ytterbium element content was more than 30% by weight in terms of its oxide (Comparative Example 2), sintering was difficult and, consequently, it was impossible to obtain a low electrical resistance and the bending strength obtained was low.

As shown in Table 2, when the aluminum element content was less than 1% by weight in terms of its oxide (Comparative Example 3), it was impossible to obtain a sufficiently low thermal conductivity; when the aluminum element content was more than 20% by weight in terms of its oxide (Comparative Example 4), sintering was difficult and, consequently, it was impossible to obtain a low electrical resistance and the bending strength obtained was low.

In Example 11, when the firing temperature was higher than 1,850° C., the silicon nitride sintered material obtained had too high a thermal conductivity; therefore, a firing temperature of 1,850° C. or lower is preferred.

When firing was made at 1,850° C. for a molded material using a silicon nitride powder containing a β-phase in an amount of less than 10% by weight, the silicon nitride sintered material obtained was not dense and had residual pores, and was not low in electrical resistance; therefore, the proportion of β-phase in silicon nitride powder is preferred to be 10% by weight or more.

As described above, the present invention can provide a silicon nitride sintered material which has heat-shieldability, appropriate electric conductivity, high strength and excellent corrosion resistance and which is dense; therefore, the sintered material can be suitably used, for example, as a member for use in equipment for semiconductor production or a member for mounting an electronic part(s) thereon.

What is claimed is:

1. A process for producing a silicon nitride sintered body, comprising:

preparing a raw material comprising silicon nitride powder, at least 10 parts by weight of which is β-silicon nitride, 10 to 30 wt % Yb in the form of an oxide, and 1 to 20 wt % Al in the form of an oxide;

molding the raw material to form a molded body; and firing the molded body in a non-oxidizing atmosphere at no more than 1,850° C., wherein said silicon nitride sintered body has a thermal conductivity of 40 W/mK or less at room temperature, a resistivity of $1 \times 10^5$ to $1 \times 10^{12}$ Ω·cm at room temperature, and a porosity of 0.5% or less.

2. The process of claim 1, wherein said molded body is fired under a gas pressure when the firing temperature exceeds 1,800° C.

3. The process of claim 1, wherein the molded body is fired at normal pressure when the firing temperature is 1,800° C. or less.

* * * * *